(12) United States Patent  
Johnson

(10) Patent No.: US 10,287,844 B2
(45) Date of Patent: May 14, 2019

(54) BALL LAUNCHER

(71) Applicant: STONEWALL ENERGY CORP., Red Deer, Alberta (CA)

(72) Inventor: Darren Johnson, Red Deer (CA)

(73) Assignee: STONEWALL ENERGY CORP., Red Deer, Alberta (CA)

( * ) Notice: Subject to any disclaimer, the term of this patent is extended or adjusted under 35 U.S.C. 154(b) by 13 days.

(21) Appl. No.: 15/622,640

(22) Filed: Jun. 14, 2017

(65) Prior Publication Data

US 2018/0002999 A1    Jan. 4, 2018

Related U.S. Application Data

(60) Provisional application No. 62/355,067, filed on Jun. 27, 2016.

(30) Foreign Application Priority Data

Aug. 5, 2016 (CA) ...................... 2938017

(51) Int. Cl.
| E21B 33/068 | (2006.01) |
| E21B 34/02 | (2006.01) |
| E21B 34/06 | (2006.01) |
| F16L 55/46 | (2006.01) |
| E21B 43/26 | (2006.01) |
| B65G 17/12 | (2006.01) |
| B65G 23/26 | (2006.01) |

(52) U.S. Cl.
CPC ............ *E21B 33/068* (2013.01); *E21B 43/26* (2013.01); *B65G 17/126* (2013.01); *B65G 23/26* (2013.01); *B65G 2201/02* (2013.01); *E21B 34/02* (2013.01); *E21B 34/06* (2013.01)

(58) Field of Classification Search
None
See application file for complete search history.

(56) References Cited

U.S. PATENT DOCUMENTS 7,234,525 B2 * 6/2007 Alves ................... E21B 33/068
166/310
9,976,686 B2 * 5/2018 Sander ................... B08B 9/055

FOREIGN PATENT DOCUMENTS

| CA | 2818250 | 12/2014 |
| CA | 2821324 | 1/2015 |

* cited by examiner

Primary Examiner — Matthew R Buck
Assistant Examiner — Douglas S Wood
(74) Attorney, Agent, or Firm — King & Schickli, PLLC

(57) ABSTRACT

A ball launcher for launching a plurality of balls into a well, including an endless conveyor belt, the conveyor belt forming a plurality of ball retainers, each operable to contain one of the plurality of balls, a drive motor for selectively driving the conveyor belt, and a brake for braking the conveyor belt.

27 Claims, 9 Drawing Sheets

BALL LAUNCHER

FIELD

The present disclosure relates generally to down-hole tools. More particularly, the present disclosure relates to apparatus, systems, and methods to drop balls to activate down-hole tools.

BACKGROUND

CA 2,821,324 is titled "BALL LAUNCHER FOR A TUBING STRING", and discloses a helical flight ball conveyor for dropping balls.

CA 2,818,250 is titled "ATMOSPHERIC BALL INJECTING APPARATUS, SYSTEM AND METHOD FOR WELLBORE OPERATIONS", and discloses a ball retaining and release mechanism for retaining and selectively releasing balls. The interior of the ball injecting apparatus is open to atmospheric pressure during operations.

It is, therefore, desirable to provide a ball launcher.

SUMMARY

It is an object of the present disclosure to obviate or mitigate at least one disadvantage of previous ball launchers.

In a first aspect, the present disclosure provides a ball launcher apparatus for delivering a plurality of balls into a well including an elongate housing, a conveyor belt, the conveyor belt forming a plurality of ball retainers, each ball retainer operable to contain one of the plurality of balls, the housing having at least one opening for loading the plurality of balls into the housing and into the plurality of ball retainers of the conveyor belt, a drive motor for selectively driving the conveyor belt, a brake for braking the conveyor belt, and a ball drop opening.

In an embodiment disclosed, the ball retainers include segments or compartments formed in buckets.

In an embodiment disclosed, the ball retainers include segments or compartments formed between paddles or dividers.

In an embodiment disclosed, the brake includes a brake sprocket, having a plurality of sprocket stops and a corresponding brake stop, the sprocket stops connected with the conveyor belt and the brake stop connected with the housing, wherein the sprocket stops are aligned with the ball retainers of the conveyor belt.

In an embodiment disclosed, the drive motor selected from the group of hydraulic motor, pneumatic motor, and electric motor.

In an embodiment disclosed, the brake is selected from the group of hydraulic brake, pneumatic brake, and electric brake.

In an embodiment disclosed, the motor comprising a hydraulic motor and the brake comprising a hydraulic brake.

In an embodiment disclosed, the hydraulic motor and the hydraulic brake are linked by a pressure sensored hydraulic system.

In an embodiment disclosed, the at least one opening is covered by a transparent covering.

In an embodiment disclosed, the housing and the transparent covering are substantially waterproof.

In an embodiment disclosed, the brake sprocket includes a high visibility marker indicative of its rotational position.

In an embodiment disclosed, the ball launcher further comprising an access port, proximate the ball drop opening, adapted to manually drop a ball.

In a further aspect the present disclosure provides a ball launcher system for launching balls into a wellbore of a well, the well having a wellhead, the ball launcher system including the ball launcher described above, a wellhead assembly between the ball launcher and the wellhead, the wellhead assembly including an upper powered valve, a lower powered valve, a staging region between the upper powered valve and the lower powered valve, and a closing unit for selectively activating the conveyor belt, the brake, the upper powered valve, and the lower powered valve.

In an embodiment disclosed, the ball launcher system further comprising a vent, from the staging region to a vent tank, the vent operable by a powered vent valve.

In an embodiment disclosed, the ball launcher system further comprising a back-up ball entry port for accessing the staging region.

In an embodiment disclosed, the ball launcher system further comprising a cap for selectively opening and closing the back-up ball entry port.

In an embodiment disclosed, the motor comprising a hydraulic motor and the brake comprising a hydraulic brake.

In an embodiment disclosed, the hydraulic motor and the hydraulic brake are linked by a pressure sensored hydraulic system.

In an embodiment disclosed, the ball launcher further includes an access port, proximate the ball drop opening, adapted to manually drop a ball.

In a further aspect the present disclosure provides a method for launching balls into a well, including providing the ball launcher system described above, loading at least one ball into the ball launcher, selectively operating the ball launcher to release the brake and drive the conveyor belt to release the at least one ball into the well.

In an embodiment disclosed, the ball actuates a downhole tool in the wellbore to perform a wellbore operation.

In an embodiment disclosed, the downhole tool is a frac port and the wellbore operation is a frac operation.

In an embodiment disclosed, the at least one ball comprises balls of about the same diameter.

In an embodiment disclosed, the at least one ball comprises balls of graduated size, loaded into the ball retainers in the order of smallest to largest.

In an embodiment disclosed, the method further includes selectively dropping one of the at least one balls into the well, pumping a frac fluid or proppant or both, and repeating the process for a number of frac stages.

In an embodiment disclosed, releasing the at least one ball into the well comprises staging the at least one ball into the well.

In an embodiment disclosed, the staging includes, with the lower powered valve closed, opening the powered vent valve to open the vent and opening the upper powered valve, releasing the at least one ball into the staging region, closing the powered vent valve and closing the upper powered valve, and opening the lower powered valve to release the at least one ball into the well.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
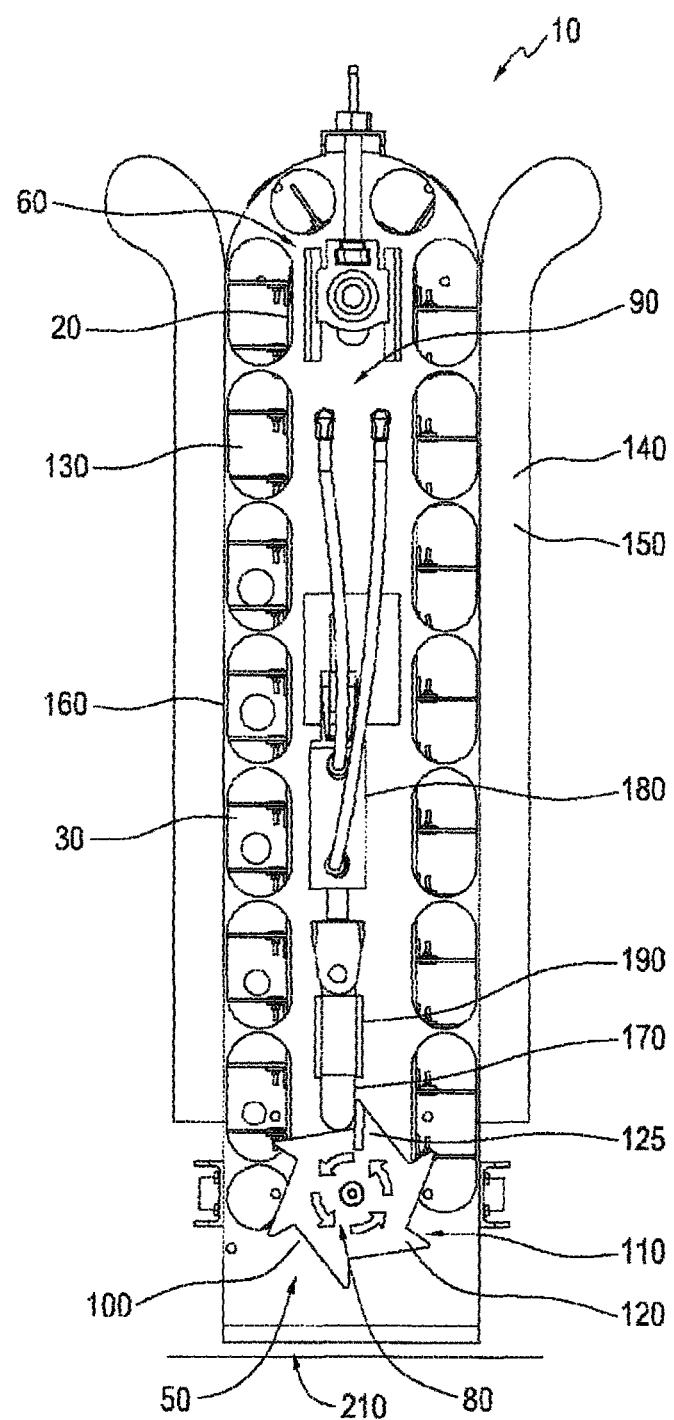
FIG. 1 is a front view of a ball launcher of the present disclosure.
Figure 2:
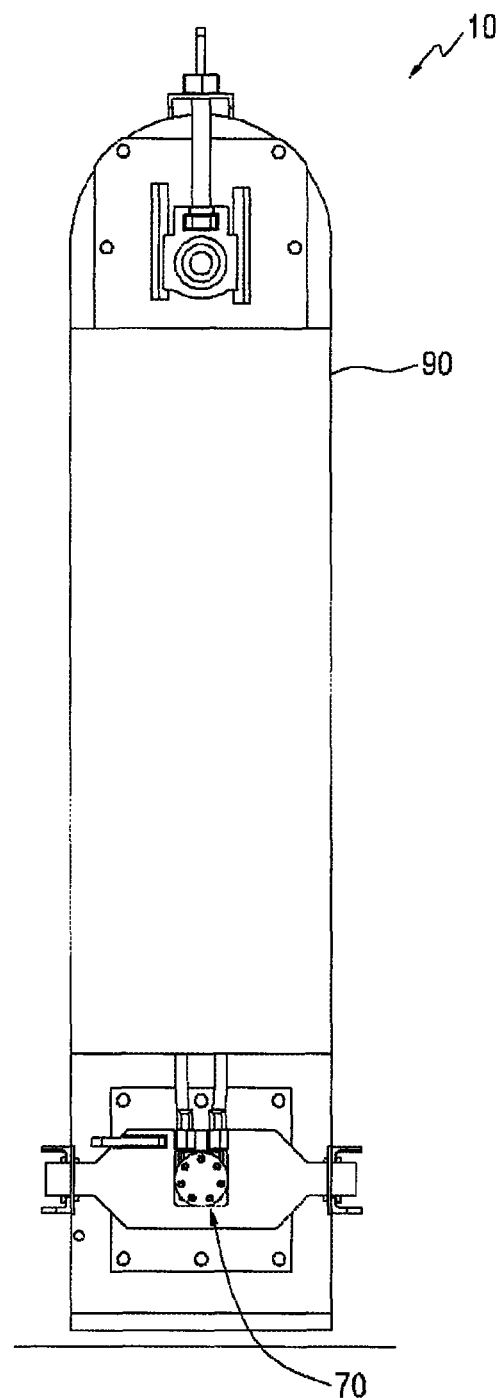
FIG. 2 is a back view of the ball launcher of FIG. 1.
Figure 3:
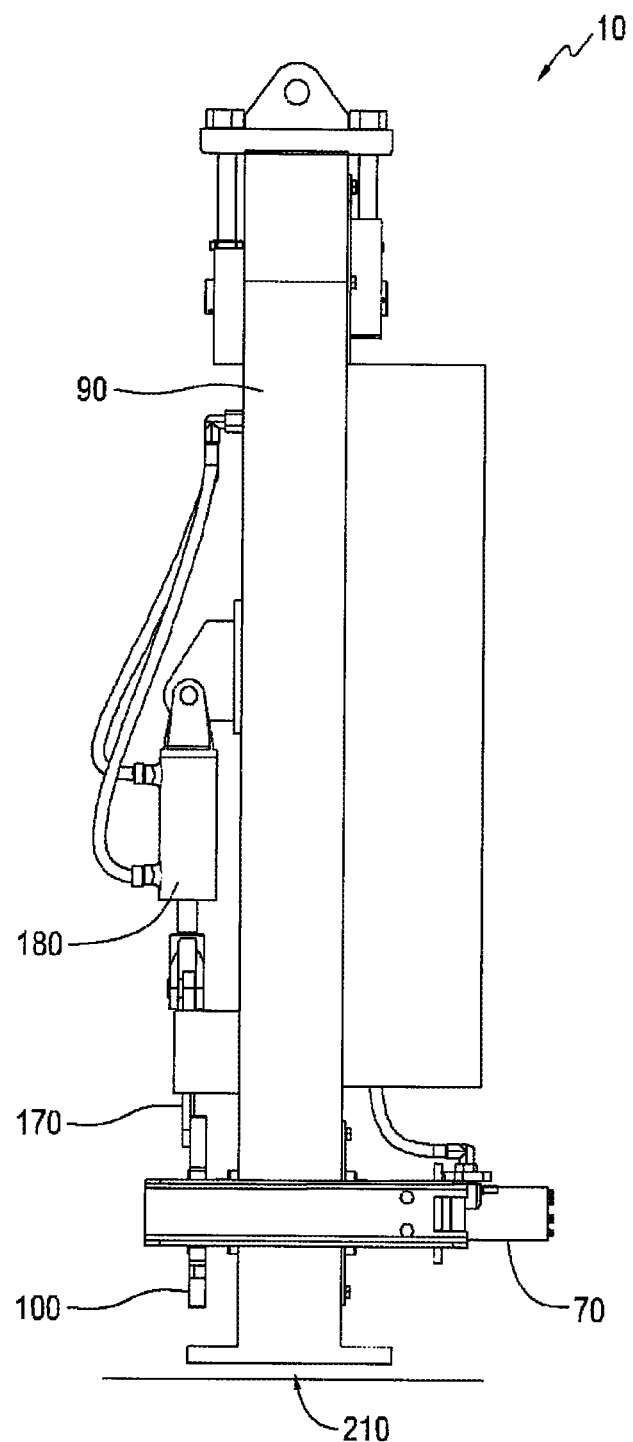
FIG. 3 is a right view of the ball launcher of FIG. 1.

Generally, the present disclosure provides a method and system and apparatus for launching balls down a well. A ball launcher for selectively launching a plurality of balls into a well, one at a time, including an endless conveyor belt, the conveyor belt forming a plurality of ball retainers, each operable to contain one of the plurality of balls, a drive motor for selectively driving the conveyor belt, and a brake for braking the conveyor belt.

Referring to FIGS. 1-6, the non-pressurized ball launcher 10 includes a conveyor belt 20 having a plurality of ball retainers in the form of segments or compartments 30 formed between paddles or dividers 40. The conveyor belt 20 may be made of a flexible material, such as a rubber. The conveyor belt 20 extends around a drive/head pulley 50 and a tail pulley 60, and may be driven, for example, by a hydraulic motor 70 via the drive/head pulley 50. A brake 80 ensures that the conveyor belt 20 rotates no more than the amount necessary to drop one (next) ball. In an embodiment disclosed, the housing 90 is operated at about atmospheric pressure.

The brake 80 includes a brake sprocket 100 connected and rotatable with the conveyor belt 20, for example to the drive/head pulley 50 as shown, and ensures that it is impossible to over-rotate the conveyor belt 20. The brake sprocket 100 has a number (6 shown) of sprocket stops 110, e.g. teeth 120 which coincide with the conveyor belt segments or compartments 30 on a 1:1 basis, with each sprocket stop 110 matching one segment or compartment 30. A high visibility marker 125 may be provided on the brake sprocket 100 to allow one to visually observe or confirm the position of the brake sprocket 100. The brake 80 is continually engaged except when it is momentarily released to allow the brake sprocket 100 to rotate and thus the conveyor belt 20 to move the predetermined amount.

A brake stop 170 is movable between an engaged position (shown FIG. 1) and a disengage position (not shown). In the engaged position, the brake sprocket 100 is stopped from rotating because sprocket stop 110 (tooth 120) bears on the brake stop 170. In the disengaged position (not shown), the sprocket stop 100 (tooth 120) clears the brake stop 170 and thus brake sprocket 100 is able to rotate momentarily (until the brake stop 170 is automatically moved back into the engaged position). A brake hydraulic actuator 180 (commonly referred to as a RAM) moves the brake stop 170 between the engaged position (shown FIG. 1) and the disengaged position (not shown). As shown, the brake stop 170 may be movable linearly in guide 190.

The housing 90 of the ball launcher 10 may have a number of openings 130, which may be covered with a transparent covering 140, such as transparent Lexan®. The transparent covering 140 may be, for example, a sliding or a hinged cover, in an embodiment disclosed, the shutters 150 provide the transparent covering 140. This provides for access to the conveyor belt 20 to load the ball launcher 10 with balls, and allows one to visually observe or confirm the balls 160 loaded and their respective size or condition or both.

The housing 90 and the covering 140 provide a weather-proof or weather resistant enclosure, to protect the balls 160 from the environment (e.g. rain/snow) which is important for dissolvable balls which may degrade or are at risk of degradation in rain or snow. In an embodiment disclosed, the ball launcher 10 holds about 30 balls.

A pressure sensored hydraulic system 400 (see FIG. 9) allows the conveyor belt 20 to rotate one step, and only one step, with each one step corresponding to a conveyor belt segment or compartment 30. When an operator selectively activates a ball drop control lever 200 (see FIG. 7) to control a hydraulic valve to activate the conveyor belt 20 brake 80, the hydraulic pressure increases to the brake hydraulic actuator 180, causing the brake stop 170 to retract into the disengaged position (permitting rotation of the brake sprocket 100 and thus movement of the drive/head pulley 50 and thus the conveyor belt 20), but as the hydraulic motor 70 starts to rotate, the hydraulic pressure drops and the brake stop 170 extends back into the engaged position, such that the sprocket stop 110 is restrained by the brake stop 170. Thus a single activation of the ball drop control lever 200 will release the brake 80 and allow rotation of the conveyor belt 20 one segment or compartment 30, but no more, allowing one and only one ball 160 to be released from the ball launcher 10 via the ball drop opening 210.

The ball drop control lever 200 must be released and activated again in order to repeat the brake release and conveyor belt movement process. When the conveyor belt ball retainers (e.g. segments or compartments 30 formed between paddles or dividers 40 or segments or compartments 30 formed by buckets 35) are loaded with balls, this provides for launching of the ball or balls within a segment or compartment 30. Usually, it is one ball 160 per segment or compartment 30.

While the brake/motor are described as hydraulic, they may instead be pneumatic or electric operated. The brake may be momentarily released for example by pneumatic pressure or electric actuator and the drive motor operated by pneumatic pressure or electric motor to move the conveyor belt or combinations thereof.

Figure 6:
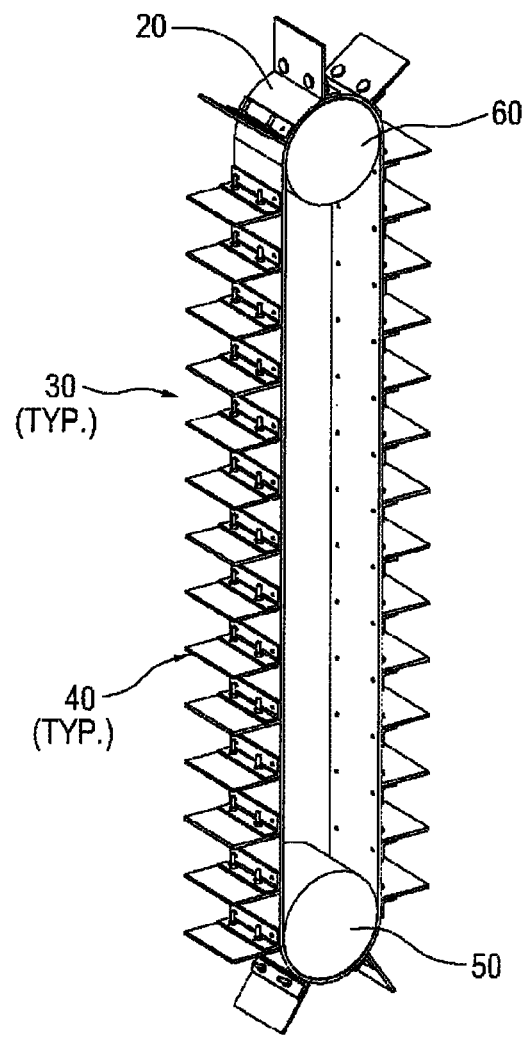
FIG. 6 is a detail of a conveyor belt of the present disclosure.
Figure 6A:
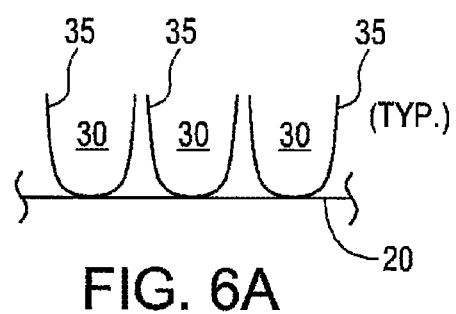
FIG. 6A is an alternate detail of a conveyor belt of the present disclosure.

Referring to FIG. 6A, as an alternate to the configuration of FIG. 6 (segments or compartments 30 formed between paddles or dividers 40), segment or compartments 30 may be provided by buckets 35.

Figure 7:
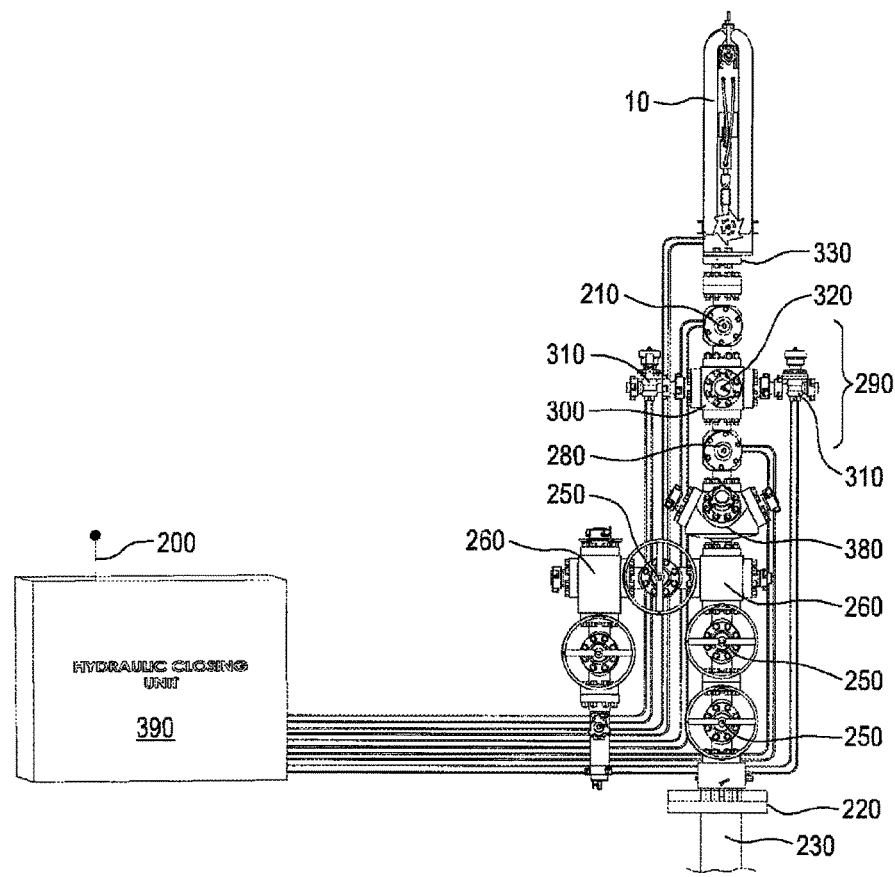
FIG. 7 is the ball launcher of the present disclosure in association with a wellhead.

Referring to FIG. 7, the ball launcher 10 is mounted on a wellhead assembly 220 associated with a wellhead 230 of a well 240. The wellhead assembly 220 includes a number of valves 250, fittings, and blocks 260. The wellhead assembly 220 also includes a hydraulic upper valve 270, a hydraulic lower valve 260, and a staging region 290 in-between. As shown, the staging region 290 may include a block 300, with access via one or more hydraulic plug valves 310 (e.g. to charge/vent) and also provides back-up ball entry 320 (e.g. to manually drop a ball 160). The ball launcher 10 is mounted via mounting spool 330.

Figure 4:
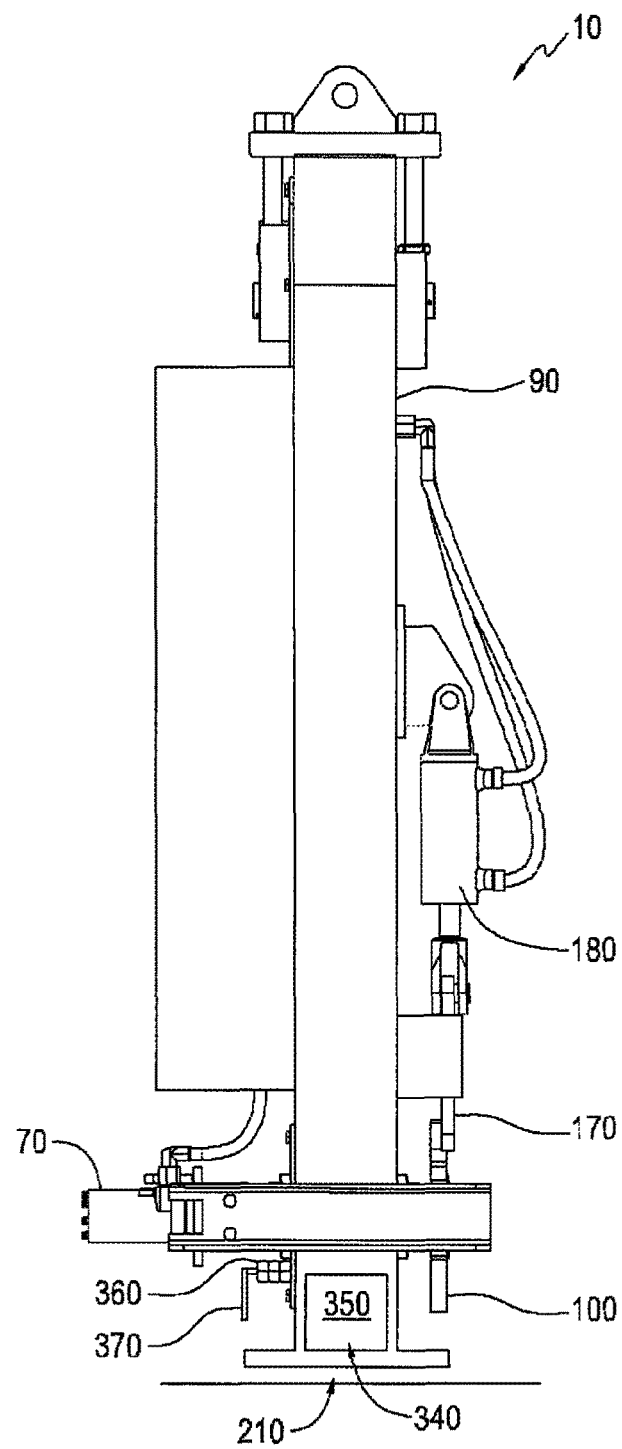
FIG. 4 is a left view of the ball launcher of FIG. 1.
Figure 5:
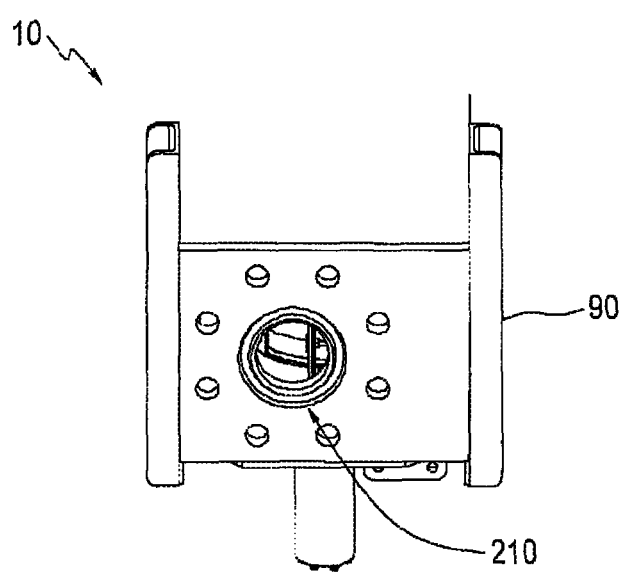
FIG. 5 is a bottom view of the ball launcher of FIG. 1.
Figure 8:
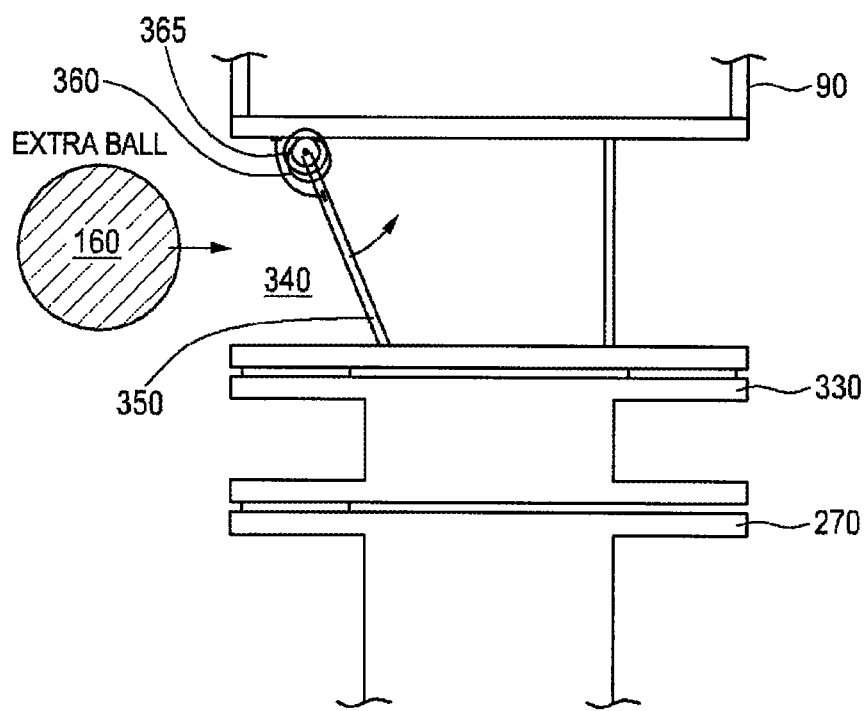
FIG. 8 is an access port of the present disclosure.

Referring to FIGS. 4 and 8, access port 340 allows the manual insertion of a ball 160 to the well 240. A flap 350 is movable about pivot 365. The flap 350 may be held in place (closed) by gravity or may be biased close by a spring 360.

A lever 370 connected with the flap 350 may be used to open the flap 350 so that a ball 160 may be manually dropped.

In operation, the ball launcher 10 is loaded with the balls 160, either before or after the ball launcher 10 is set on the wellhead assembly 220. If the balls 160 are of different sizes, for example, graduated sizing for multi-stage frac ports for a frac operation, the balls 160 are loaded in the appropriate order (i.e. such that the balls 160 are set to be dropped smallest to largest). The balls 160 loaded in ball launcher 10 may be visually observed or audited at any time in a non-destructive and non-intrusive manner via openings 130 and transparent covering 140. In a frac operation, the frac fluid or proppant or both would be pumped down the well via the buffalo head 380 (but the piping is not shown).

To commence the operation, a hydraulic closing unit 390 is provided and the ball drop control lever 200 is operated to release the hydraulic brake 80 momentarily and drive the hydraulic motor 70 to move the conveyor belt 20 to drop the next ball 160 from the ball drop opening 210 (as described previously), through the hydraulic upper valve 270, into the staging region 290. The hydraulic upper valve 270 is then closed, and the hydraulic lower valve 280 opened, allowing the ball 160 to fail from the staging region 290 into the well 240. The hydraulic lower valve 280 can then be closed, and the staging region 290 vented.

In the well 240, for example in a tubing siring in the well, the ball 160 activates one or more downhole tools, such as opening a frac port or ports or sealing off a bridge plug or other well operation utilizing drop balls, known to a person skilled in the art.

In a multi-stage frac operation, where the ball 160 has opened a frac port, frac fluid or proppant or both are then pumped, via the buffalo head 380, for a period of time or a measured quantity of fluid or proppant. When the next ball 160 is to be released, the above process is repeated, and so on (very simplistically, drop ball, pump fluid/proppant, drop ball, pump fluid/proppant, drop ball, pump fluid/proppant, until all stages complete, and then backflow balls 160 or pieces thereof to surface).

Figure 9:
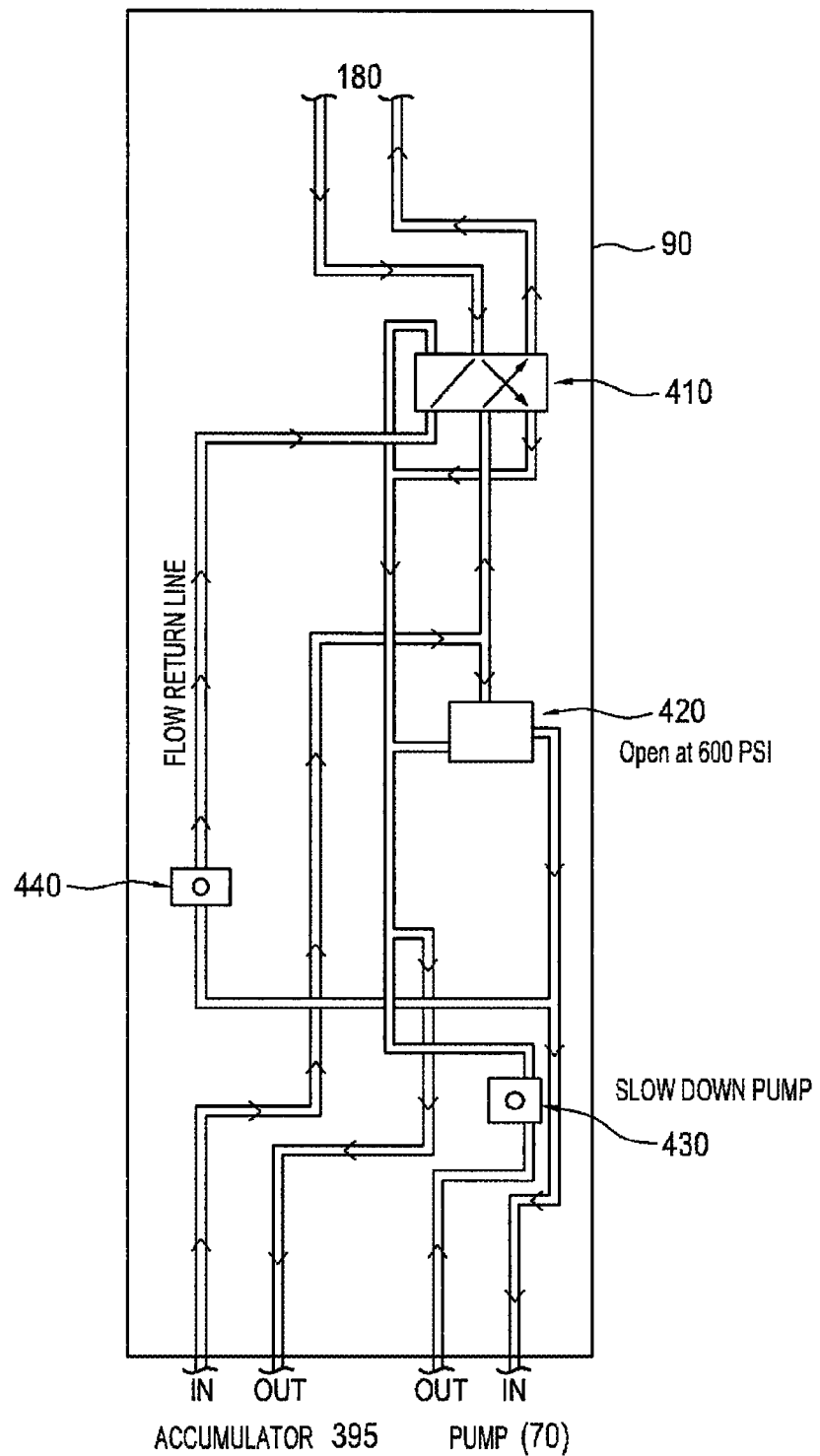
FIG. 9 is a schematic of a pressure sensored hydraulic system of the present disclosure.

Referring to FIG. 9, the pressure sensored hydraulic system 400 may be conveniently attached to the housing 90 (but need not be). Hydraulic fluid from accumulator (395) of the hydraulic closing unit (390) is supplied to a set pressure block 410 and a controlled pressure block 420. At low pressure, hydraulic pressure is routed to the brake hydraulic actuator 180 to engage the brake 80 and is not routed to drive the hydraulic motor 70. However, at high pressure, when the ball drop control lever 200 (see FIG. 7) is applied, for example a pressure greater than about 600 psi, the controlled pressure block 420 opens, to drive the brake hydraulic actuator 180 to disengage the brake 80 and to turn the hydraulic motor 70. However, because the hydraulic actuator 180 and the hydraulic motor 70 are hydraulically coupled, the hydraulic pressure drops, and the brake hydraulic actuator 180 engages the brake 80 so the hydraulic motor 70 can turn only until sprocket stop 110 hits the brake stop 170 (see FIG. 1 as described above). Needle valve 430 and needle valve 440 provide for adjustment or fine tuning of the hydraulic system.

In the preceding description, for purposes of explanation, numerous details are set forth in order to provide a thorough understanding of the embodiments. However, it will be apparent to one skilled in the art that these specific details are not required. In other instances, well-known structures and components are shown generally in order not to obscure the understanding.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A ball launcher apparatus for delivering a plurality of balls into a well comprising:
   an elongate housing;
   an endless conveyor belt within the housing, the conveyor belt forming a plurality of ball retainers, each operable to contain one of the plurality of balls, the housing having at least one opening for loading the plurality of balls into the housing and into the plurality of ball retainers of the conveyor belt;
   a drive motor at one end of the housing, the drive motor selectively driving the conveyor belt;
   a brake operatively coupled to the conveyor belt for braking the conveyor belt; and
   a ball drop opening positioned at a bottom of the elongate housing and passing through the elongate housing from at least one of the plurality of ball retainers, the ball drop opening configured to operatively couple to a wellhead assembly so that the elongate housing is positioned above the wellhead assembly and a ball dropped from the at least one of the plurality of plurality of ball retainers through the ball drop opening drops into the wellhead assembly.

2. The ball launcher of claim 1, wherein the ball retainers comprise segments or compartments formed in buckets.

3. The ball launcher of claim 1, wherein the ball retainers comprise segments or compartments formed between paddles or dividers.

4. The ball launcher of claim 1, the brake comprising a brake sprocket, having a plurality of sprocket stops and a corresponding brake stop, the sprocket stops connected with the conveyor belt and the brake stop connected with the housing, wherein the sprocket stops are aligned with the ball retainers of the conveyer belt.

5. The ball launcher of claim 1, the drive motor selected from the group of hydraulic motor, pneumatic motor, and electric motor.

6. The ball launcher of claim 1, the brake selected from the group of hydraulic brake, pneumatic brake, and electric brake.

7. The ball launcher of claim 1, the motor comprising a hydraulic motor and the brake comprising a hydraulic brake.

8. The ball launcher of claim 7, the hydraulic motor and the hydraulic brake linked by a pressure-sensored hydraulic system.

9. The ball launcher of claim 1, wherein the at least one opening is covered by a transparent covering.

10. The ball launcher of claim 9, wherein the housing and the transparent covering are substantially waterproof.

11. The ball launcher of claim 4, wherein the brake sprocket includes a high visibility marker indicative of its rotational position.

12. The ball launcher of claim 1, further comprising an access port, proximate the ball drop opening, adapted to manually drop a ball.

13. A ball launcher system for launching balls into a wellbore of a well, the well having a wellhead, the ball launcher system comprising:
   the ball launcher apparatus of claim 1;

the wellhead assembly between the ball launcher and the wellhead, the wellhead assembly comprising:
an upper powered valve operatively coupled to the ball drop opening; a lower powered valve operatively coupled to the wellhead;
a staging region between the upper powered valve and the lower powered valve; and
a closing unit for selectively activating:
the drive motor to drive the conveyor belt, the brake stopping the conveyor belt when a next ball retainer reaches the ball drop opening, the upper powered valve to receive at least one of the plurality of balls into the staging region, and the lower powered valve for releasing the at least one of the plurality of balls from the staging region.

14. The ball launcher system of claim 13, further comprising a vent, from the staging region to a vent tank, the vent operable by a powered vent valve.

15. The ball launcher system of claim 13, further comprising a back-up ball entry port for accessing the staging region.

16. The ball launcher system of claim 15, further comprising a cap for selectively opening and closing the back-up ball entry port.

17. The ball launcher system of claim 13, the motor comprising a hydraulic motor and the brake comprising a hydraulic brake.

18. The ball launcher system of claim 13, the hydraulic motor and the hydraulic brake linked by a pressure-sensored hydraulic system.

19. The ball launcher system of claim 13, the ball launcher further comprising an access port, proximate the ball drop opening, adapted to manually drop a ball.

20. A method for launching balls into a well, comprising:
providing the ball launcher system of claim 13;
loading at least one ball into the ball launcher;
selectively operating the ball launcher to release the brake and drive the conveyor belt to release the at least one ball into the well.

21. The method of claim 20, wherein the ball actuates a downhole tool in the wellbore to perform a wellbore operation.

22. The method of claim 21, wherein the downhole tool is a frac port and the wellbore operation is a frac operation.

23. The method of claim 20, wherein the at least one ball comprises balls of about the same diameter.

24. The method of claim 20, wherein the at least one ball comprises balls of graduated size, loaded into the ball retainers in the order of smallest to largest.

25. The method of claim 20, further comprising selectively dropping one of the at least one balls into the well, pumping a frac fluid or proppant or both, and repeating the process for a number of frac stages.

26. The method of claim 20, wherein releasing the at least one ball into the well comprises staging the at least one ball into the well.

27. The method of claim 26, wherein the staging comprises:
with the lower powered valve closed, opening the powered vent valve to open the vent and opening the upper powered valve;
releasing the at least one ball into the staging region;
closing the powered vent valve and closing the upper powered valve; and
opening the lower powered valve to release the at least one ball into the well.

\* \* \* \* \*